(12) United States Patent
Sechrist et al.

(10) Patent No.: US 8,744,912 B2
(45) Date of Patent: Jun. 3, 2014

(54) METHOD AND SYSTEM FOR AN ADVANCED PLAYER IN A NETWORK OF MULTIPLE LIVE VIDEO SOURCES

(75) Inventors: Andrew Blough Sechrist, San Francisco, CA (US); Vladan Djakovic, San Francisco, CA (US); Ognjen Sami, Beograd (RS); Jonathan Daniel Mendelson, San Carlos, CA (US); William John Delveaux, San Jose, CA (US)

(73) Assignee: Koozoo Inc., San Francisco, CA (US)

( * ) Notice: Subject to any disclaimer, the term of this patent is extended or adjusted under 35 U.S.C. 154(b) by 163 days.

(21) Appl. No.: 13/494,884

(22) Filed: Jun. 12, 2012

(65) Prior Publication Data

US 2012/0265621 A1 Oct. 18, 2012

Related U.S. Application Data

(63) Continuation-in-part of application No. 13/421,053, filed on Mar. 15, 2012.

(60) Provisional application No. 61/517,096, filed on Apr. 14, 2011.

(51) Int. Cl.
*G06Q 30/02* (2012.01)
*H04N 21/81* (2011.01)

(52) U.S. Cl.
USPC ...................................... 705/14.73

(58) Field of Classification Search
CPC .......... G06Q 30/0277; H04N 1/00464; H04N 21/812; G06F 17/30849; G06F 17/30861; G06F 17/30781; G06F 2212/264

USPC ................ 705/14.49, 14.66, 14.73; 709/219; 715/719

See application file for complete search history.

(56) References Cited

U.S. PATENT DOCUMENTS 6,564,380 B1 * 5/2003 Murphy .......................... 725/86
8,504,426 B2 * 8/2013 Petta .......................... 705/14.73

OTHER PUBLICATIONS

"HTML5 video embed instructions", downloaded Jan. 5, 2014 from http://html5media.info/.*

* cited by examiner

*Primary Examiner* — Donald L. Champagne
(74) *Attorney, Agent, or Firm* — Edward C. Kwok; Hogan Lovells US LLP

(57) ABSTRACT

A method for providing a video player for a network of multiple live video sources includes: causing to be included in a webpage a first program line embedding a universal resource locator wherein, when the webpage is received into a web browser running on a computing device, the first code line causes the web browser to retrieve a file specified by the universal resource locator, the file executed within the web browser; including in the file a program code wherein, when the program code is executed at the web browser, the program code provides in the web browser a video player having capability to communicate messages between the video player and an application server; serving the file to the web browser when the web browser retrieves the executable file at the universal locator; and at the application server, handling message communication between the video player and the application server.

19 Claims, 13 Drawing Sheets

METHOD AND SYSTEM FOR AN ADVANCED PLAYER IN A NETWORK OF MULTIPLE LIVE VIDEO SOURCES

CROSS REFERENCE TO RELATED APPLICATIONS

The present application claims priority to and is a continuation-in-part of U.S. patent application Ser. No. 13/421,053, entitled "A Method and System For A Network Of Multiple Live Video Sources," by Andrew Sechrist, Vladan Djakovic, Ognjen Sarni, Jonathan Mendelson, and William Delveaux, filed on Mar. 15, 2012, which claims the benefit of U.S. Provisional Application No. 61/517,096, filed Apr. 14, 2011, the contents of which are incorporated herein by reference in their entirety, for all purposes.

BACKGROUND

1.—Field of the Invention

Embodiments described herein relate to networked sensors. More particularly, embodiments described herein are related to a network of video sources that can be accessed through a network streaming service using a video player.

2.—Description of Related Art

Hardware and software used to setup and manage networked systems have advanced considerably. Web servers now typically operate in a massively parallel fashion, and storage continues to increase in size and decrease in cost. Faster switches using advanced routing techniques have become pervasive, while the bandwidth of data transmission also keeps increasing. Such technological advances have created opportunities for sharing large amounts of information over an ever-expanding network. Concurrently, increasingly sophisticated techniques for analyzing the shared information provide valuable metrics. Furthermore, many networked systems have the capability of reporting their geographic locations with precision.

In the prior art, a typical online application or service that includes one or more embedded video streams is supported by a single broadcasting entity or publisher. Such an application or service seldom involves streams from multiple live video sources (e.g., cameras). In another prior art application, multiple users may upload video content to a network, to be viewed at later times by other users. However, in such an application, the video content is of a previous time, and does not provide real-time information of current events. Furthermore, many existing online video applications allow the general public to broadcast or view their contents without restrictions, such that there is little or no content supervision or user management. Such applications expose broadcasting users to risk, and viewers to unwanted content. Moreover, in current video-sharing networks, there is little or no capability for the content creator or broadcaster to derive value from the video broadcast.

Current video player, embedded applications or 'widgets' running on web interfaces (e.g., a web browser) are considered anonymous because the user or viewer is not identified. Thus, even when an application server offers the ability to 'vote' on the quality of a video stream or to provide input from the viewer, the viewer remains anonymous. This ability to take anonymous action by a viewer exposes the network to abuse by malicious or interested parties.

One state-of-the-art online video provider offers a number of widgets or applications which provide at a website controls and features applicable to some aspects of the video content. For example, one widget allows a user to provide a feedback on the quality of the content. However, these widgets or applications are expected to be separately integrated and managed by the website developer who intends to provide the website visitors the use of such controls and features from its web pages. However, in such a model, any time a feature is made available, the website developer needs to incorporate into the current stream the new widget or application that encapsulates the feature and ensure the new application works properly with the existing applications. This process adds an extra layer of design complexity that deters the fast adoption of new features to the widget.

The Internet has facilitated broadcast of recorded and live video content. However, in current systems and applications a consumer cannot readily determine whether or not a particular video stream is live. When the video stream is not live, the consumer cannot readily determine when the video stream was recorded. Similarly, it is difficult to determine where the events in the video stream took place, or were recorded. The uncertainty in such information diminishes the value of all video sources, as the origins of the information may not be determined, nor can fabricated video sources be identified. Therefore, both viewers and broadcasters are penalized. As a result, the perceived value of a current online video stream depends to some degree on the trustworthiness of the publisher, which must be built up over time with a sizeable viewership. Many potentially useful sources are thus left out of this 'trust' domain. Indeed, particular individuals and small entities may provide valuable video streams but have no easy way of establishing their trustworthiness without sponsorship of established publishers, who may extract onerous contract agreements from these individuals or small entities.

What is needed is a secured and managed environment to allow users or viewers to access networked video sources using an interactive toolbar controlled by a single application run by a service provider.

SUMMARY

According to some embodiments disclosed herein, a method for providing a video player for a network of multiple live video sources includes: causing to be included in a webpage first program code embedding a universal resource locator wherein, when the webpage is received into a web browser running on a computing device, the first program code causes the web browser to retrieve a file specified by the universal resource locator the file being executed within the web browser including in the file a second program code wherein, when the second program code is executed at the web browser, the second program code installs in the web browser a video player having capability to communicate messages between the video player and an application server; serving the file to the web browser when the web browser retrieves the executable file at the universal locator; and at the application server, handling message communication between the video player and the application server.

In accordance with further embodiments disclosed herein, the video player may send a message to the application server requesting a specified video stream from one of the live video sources. Upon that request, the method further includes retrieving from a database information regarding a video source associated with the specified video stream; based on the retrieved information from the database, identifying a video source control server for the video source; accessing the control server to ready transmission of the specified video stream; and accessing a streaming server, and causing the streaming server to interact with the video source control server such that the specified video stream begins transmission to the video player.

These and other embodiments of the present invention will be described in further detail below with reference to the following drawings.

BRIEF DESCRIPTION OF THE DRAWINGS

In the figures, like elements are assigned like reference numbers.

DETAILED DESCRIPTION

In this detailed description, video sources and cameras are used as examples to illustrate a system of networked environmental sensors made accessible to a community of interested users. Such sensors are not limited to those providing still images and video streams, but may include thermometers, microphones, meteorological sensors, motion sensors and other suitable instruments. Data collected from such a system of networked environmental sensors may be combined with other data relevant to the interests of the community to provide new applications of business or technological significance. Some of such applications are illustrated below by the embodiments of this disclosure using video sources, such as cameras, as the environmental sensors.

In addition to the sensors and cameras described herein, embodiments of the present disclosure may include a network application running on a client device. The application may use an advanced video player that provides a unique viewing experience. Some embodiments of the advanced video player include features that enable a fast and widespread use of the network of environmental sensors and cameras by a broad viewer audience. Enticing users to become registered members, embodiments of the advanced video player as disclosed herein may enable a 'viral' awareness of the network and its capabilities.

Figure 1:
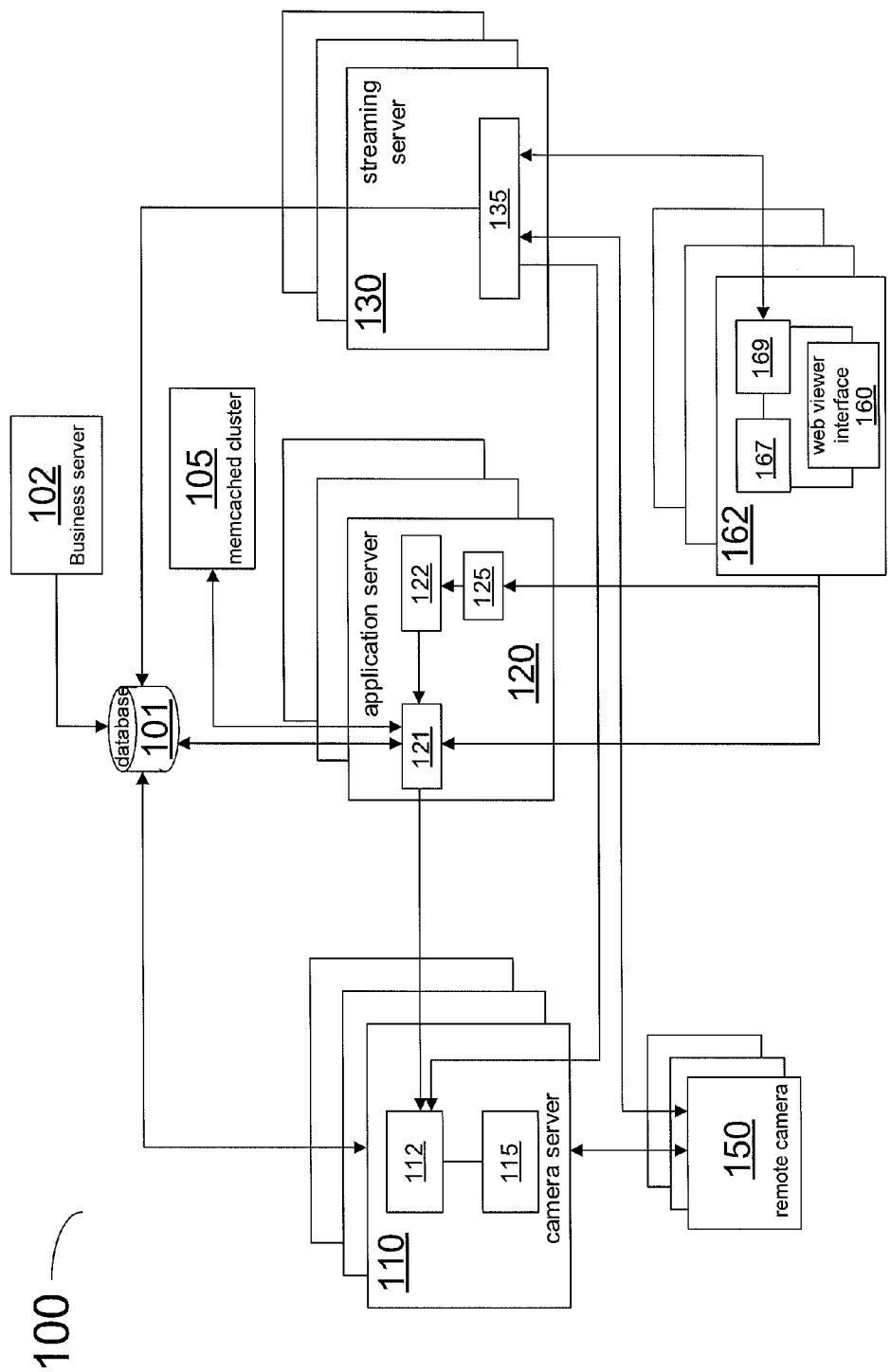
FIG. 1 illustrates a system that networks multiple live video sources, according to embodiments disclosed herein.

FIG. 1 illustrates system 100 which networks multiple live video sources, according to some embodiments of the present invention. System 100 includes database 101, business server 102 and memory-cached cluster 105. Memory-cached cluster 105 is a scalable cache layer that stores data from multiple nodes in the network to reduce demand for direct access to database 101 and to provide greater responsiveness to users. With this configuration, application server 120 may more readily access desired information from memory-cached cluster 105 than from database 101. As shown in FIG. 1, the network may include multiple camera servers, web servers and streaming servers, represented in FIG. 1 by camera server 110, application server 120, and streaming server 130, respectively. Camera server 110 manages multiple remote cameras, such as remote camera 150.

Business server 102 is an event driven server which implements business rules and calculates metrics maintained in system 100, driven by updates to database 101. For example, business server 102 updates derived data in database 101 based on implemented business rules, driven by updates to database 101 from the underlying primary data. In addition, business server 102 analyzes data in database 101 to compute metrics. For example, business server 102 may collect usage statistics of system activities, or correlate performance of users based on operating parameter values. In some embodiments, metrics computed by business server 102 may be reported to users for various novel business applications, some of which are set forth in examples described below.

According to some embodiments, business server 102 may control the start/stop streaming of video from remote camera 150 based upon business rules related to, for example, system performance, user privileges, or the cost of delivery of the streaming video. For example, some cost considerations in business server 102 may include bandwidth usage. In some embodiments cost considerations made in business server 102 may include usage of the central processing unit (CPU) in application server 120 or any of its components such as API 121, processor 122 or processor 125.

Application server 120 interacts with users of system 100 (e.g., viewers), and uses an application program interface (API) as its interface to communicate with camera server 110, database 101, and memory-cached cluster 105. Application server 120 may include an HTML render engine and a web server. Application server 120 performs functions that are driven by commands or events flowing through the API that result in operations carried out in camera server 110 and other elements of the system. Such operations, in turn, update the state and data in database 101 and trigger operations in business server 102, as described above.

Application server 120 may be accessed by a viewer using a web interface (e.g., web interface 160), which may include a web browser with a general purpose video player plug-in or a dedicated player "widget," or a dedicated application program. The number of web servers that may be deployed can increase or decrease dynamically based on the number of active viewers, the number of video streams ready to become "active" (i.e., broadcasting) and the number of active video streams served to viewers. This load balancing capability results in a highly scalable system.

Streaming server 130 serves video streams, such as a video stream generated by remote camera 150. As shown in FIG. 1, the video stream may be served to a viewer at web interface 160. Streaming server 130 communicates with camera server 110, which is capable of controlling the start and stop of the video stream from remote camera 150. In some embodiments, streaming server 130 may be implemented using a Wowza media server, as known to those skilled in the art. Alternatively, streaming server 130 may provide content to a content distribution network (CDN), which may replicate the content provided by streaming server to end recipients. In some embodiments, examples of CDNs may include Akamai, Limelight, and other CDNs known to those skilled in the art.

Viewer web interface 160 may run on computing device 162, which may include a processor (shown in FIG. 1 as processor 167) configured to execute or interpret HTML code coupled to a display 169. Alternatively, web interface 160 may be configured to receive and to display video encoded using "Flash" player protocols[1]. The specific code described herein to operate device 162, processor 167, or display 169 is not limiting. The examples above (e.g., HTML, Flash and HTML5) are only some embodiments among many other embodiments consistent with the present disclosure.

[1]Flash is a commercial name associated with certain products of Adobe Systems, Inc.

Camera server 110 may include a backend API 112 for access using hypertext transfer protocols (http) coupled to a small event driven server 115. API 112 performs several tasks in the backend of camera server 110, such as registration and authentication of remote camera 150. To register remote camera 150 with system 100, a potential user installs an application program into camera 150. In some embodiments, the application program may be downloaded from application server 120. In other embodiments, the application program may be obtained from an "AppStore" (i.e., a repository of application programs, known to those skilled in the art). The application program is preferably capable of automatic self-updating.

According to some embodiments, remote camera 150 may include sensors that monitor overall health and performance of the camera. For example, remote camera 150 may include a temperature sensor, an accelerometer, and a location determination system, such as a Global Positioning System (GPS) receiver, or a WiFi or cellular telephone triangulation system. Camera server 110 accesses remote camera 150 to obtain readings from these sensors. In some embodiments remote camera 150 may be mobile. According to some embodiments, camera server 110 may include a Geo-location tracking feature for tracking the movements of remote camera 150 based on reported locations from the location determination system in remote camera 150. In such embodiments, application server 120 may provide to web interface 160 a frequently updated map showing the instantaneous location of remote camera 150. An accelerometer may provide information (e.g., orientation relative to a vertical or horizontal axis) regarding motion of remote camera 150. This may provide a user in web interface 160 information about special events such as an earthquake, or other events of interest. Also, an accelerometer in remote camera 150 may alert application server 120 of the falling, tampering, or other extraordinary movements of remote camera 150.

Application server 120 includes API 121, processor 122, and processor 125. According to some embodiments, as mentioned above, API 121 interfaces application server 120 with camera server 110, database 101, and memory-cached cluster 105. Processor 125 may include a web server (e.g., Apache) which interfaces with web clients. Such interactions result in operations carried out in processor 122. Processor 122, which may implement an HTML render engine, is a back end processor for application server 120. Service requests to other servers are communicated through API 121. In some embodiments, a user request to start or stop a video stream is communicated through API 121 to backend API 112 of camera server 110. API 121 also provides service for accessing database 101, preferably through memory-cached cluster 105, to perform data query and commands.

Back end processor 122 may keep statistics for remote camera health and usage with collected data, or retrieved data from the sensors included in the camera. Such metrics may include server statistics, such as server state (e.g., normal operation or any of several exceptional states), number of servers in each server category, server loads (e.g., CPU or memory usage statistics, number of client connections) and uptimes. Similarly, various sensor statistics can also be collected, such as the number of attached video sources and their identifiers, sensor states (e.g., active or live, ready or stand-by, reachable, suspended, or disconnected). Database 101 may maintain detailed description of each sensor (e.g., name of owner, location, content category, description of content, historical records of registration and operation, responsive search keywords, current and historical statuses, current and historical operating parameters). Operational statistics may provide such information as the reliability of the video source, which may be useful, for example, for recommending the video source to potential viewers.

In general, data included in database 101 may be roughly classified into three categories: (i) automatically collected data; (ii) curated data; and (iii) derivative data. Automatically collected data include, for example, such data as reading from environmental sensors and system operating parameters, which are collected as a matter of course automatically. Curated data are data that are collected from examination of the automatically collected data or from other sources. Curated data include, for example, content-based categorization of the video streams. Video streams may be categorized based on user input or from content review. For example, at registration of the camera or at a later time, a user may provide a description of the expected content of the video stream provided by the camera. The user may also provide a descriptive name for the camera (e.g., "Golden Gate Bridge Monitor"). Content review may be provided by system administration or by viewer input. For example, system administration may have an on-going effort of reviewing sampled video streams to provide descriptive information in any suitable format that may be helpful to viewers looking to identify cameras of interest. Such description may also be provided by viewers. In some embodiments, the descriptive information may be provided as standardized classifiers, such as "traffic", "tranquil scene", "busy street scene", "beach", etc. may be used. Additional description, such as a list of descriptive keywords, may be used to allow viewers to identify the video source. As technology advances, content review can be achieved automatically or semi-automatically (i.e., with no or little human intervention). For example, detection of a significant amount of motion at speeds typical of automobiles may suggest that the content is "traffic." Derivative data includes any data resulting from analysis of the automatically collected data, the curated data, or any combination of such data. For example, the database may maintain a ranking of video sources based on viewership or a surge in viewership over a recent time period. Derivative data may be generated automatically or upon demand.

In some embodiments, useful viewer statistics may be collected. For example, a periodical report on the number of viewers of a video source viewing through a widget installed in on a user-maintained page may be important to an owner of that page. The average and median durations of viewing per viewing session may also be of particular interest. To collect these statistics, each installed widget is assigned a unique identifier. Viewer preference statistics may also be compiled for identifiable viewers (e.g., registered members of system 100).

Back end processor 122 also keeps updated user profiles for both broadcasting users (e.g., the broadcast user of remote camera 150), and viewing users (e.g., the viewing user at web interface 160). In some embodiments, based on usage habits, user interests and other suitable criteria, additional profile information may be maintained. Access control or facilitation may be implemented based on collected data about the users. For example, system administration may restrict access to certain video streams or data relevant to such video streams to certain classes of users. For example, while viewing of a video stream from a public camera may be unrestricted, some curated and derivative data regarding that video stream may be made available only to registered members or to advertisers. Broadcasters may also request that access to their video streams be restricted to specific users or to a specific class of users. Advertisers may request, for example, certain user profile data regarding viewers using the widgets installed on their respective web pages. Together with content review and user profile information, business rules may be made for system administration to restrict or facilitate access to video streams and corresponding data. For example, system administration may recommend to specific users video streams of their interests, based on collected data regarding their viewing habits. Such business rules may be operated by business server 102, having access to database 101.

Streaming server 130 may include streaming processor 135 running streaming software that transfers a video stream between a video source and one or more viewers at web interfaces, simultaneously.

Figure 2:
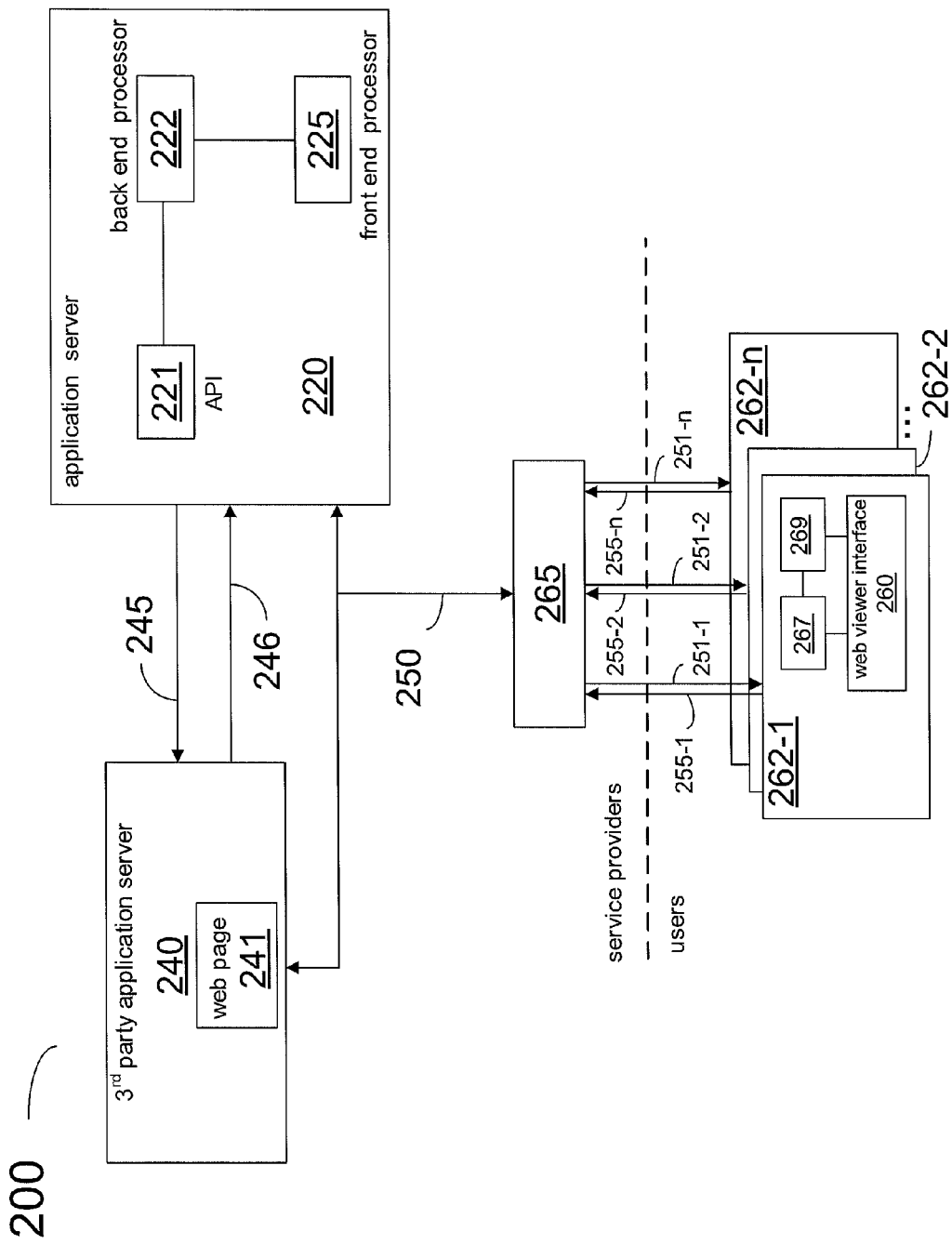
FIG. 2 illustrates a server configured to manage multiple networked live video sources and provide an advanced player to client web interfaces, according to embodiments disclosed herein.

FIG. 2 illustrates configuration 200 of application server 220 configured to manage multiple networked live video sources and to provide an advanced player 250 to each client web interfaces, according to some embodiments. A client web interface, e.g., client web interface 260, may be running on each of devices 262-1, 262-2, through 262-*n*. Load balancer 265 allocates an available bandwidth in a balanced manner among the data streams to and from application server 220 and each of devices 262-1, 262-2, through 262-*n*. Each computing device 262 includes a core processor 267, and a graphical display 269. Computing device 262, core processor 267, and display 269 may be as described above in FIG. 1 for computing device 162, core processor 167, and display 169, respectively. Application server 220 includes API 221, back end processor 222 and front end processor 225, provided in substantially the same manner as API 121, back end processor 122, and front end processor 125, as previously described (cf. FIG. 1).

In some embodiments, configuration 200 may include a third party application server 240 to service viewers of devices 262-1 through 262-*n*. According to some embodiments, third party application server 240 hosts a web page 241 that may be accessed by viewers using devices 262-1 through 262-*n*. In some embodiments, third party application server 240 may be hosted by a third party that embeds advanced player 250. Thus, users accessing third party application server 240 may have access to the network of multiple live video sources provided by application server 220. The third party may also be a registered user, a customer or an affiliate of a network of multiple live video systems consistent with the present disclosure. Thus, third party application server 240 may receive code lines 245 from application server 220, and include or embed code lines 245 in its web page 241 as a widget. Web page 241 may be served to a visitor of application server 240. As described below, embedded code lines 245, when executed or interpreted, manages interaction between such a visitor and application server 220. In some embodiments, application server 220 may provide third party application server 240 a referral ID 246, such that application server 220 can identify that the user subsequent executing embedded code lines 245 obtained the code lines from application server 240. Referral ID 246 may be used by application server 220 to track dissemination of embedded code lines 245, and for accounting purpose, for performing statistics collection and other operations related to the management of a network of multiple live video sources consistent with the present disclosure. For example, in some embodiments application server 220 may provide privileges, credits, or points to the third party hosting third party application server 240, based on the usage of the network of multiple live video sources by users accessing through web page 241. The privileges, credits or points accrued by the third party hosting third party application server 240 may be determined by a business server as business server 102 (cf. FIG. 1).

In some embodiments, referral ID 246 is used by application server 220 to identify requests coming from third party server 240. Further according to some embodiments, referral ID 246 may be encrypted. Encryption of referral ID 246 avoids misuse of services provided by the network of multiple live video sources by a fourth party application server not registered in the network hosted by application server 220.

Consistent with embodiments disclosed herein, web interface 260 obtains a copy of advanced player 250 during its access of web page 241. For example, when web interface 260, which may be a browser, loads a copy of web page 241 served to it by application server 240, embedded code lines 245 is executed on each client browser run by the corresponding one of devices 262-1 through 262-*n*. In some embodiments, embedded code lines 245 are provided to devices 262-1 through 262-*n* to retrieve from application server 220 (or another location specified in embedded code lines 245) an executable file which contains the executable code for advanced player 250. For example, in some embodiments the executable file may be located in database 101 or in memory-cached cluster 105. The executable file is then run by a browser in devices 262-1 through 262-*n*.

According to embodiments disclosed herein advanced player 250 may be customized, as needed, for each of execution on devices 262-1, 262-2, and 262-*n*. During execution of advanced player 250, web interface 260 may provide information regarding the user or regarding device 262 to application server 220. In FIG. 2, reference numerals 255-1, 255-2, through 255-*n* (generically, "255") represent information, data or metadata that is specific to devices 262-1 through 262-*n*, respectively, provided in this manner to application server 220. In some embodiments, such information may include that retrieved from of a 'cookie' previously left by application server 220 in the corresponding device (i.e., any given one of 262-1 through 262-n) that provides application server 220 a history of usage of player 250 in the device. Further according to some embodiments, information 255 may include a configuration describing the customized settings used to customize or personalize advanced player 250 by a user. In some embodiments, information 255 may include a report from a user of web interface 260 of inappropriate video content streamed by streaming server 130. Reference numerals 251-1 to 251-n represent information sent by application 220 to the advanced players running on devices 262-1 to 262-n, respectively.

In embodiments consistent with the present disclosure, advanced player 250 enables two-way communication between application server 220, and web interface 260. Advanced player 250 may be customized to provide different application capabilities to different web interfaces. According to some embodiments, as advanced player 250 is fetched and downloaded from application server 220 each time web page 241 is loaded, the latest version of advanced video player 250 is always delivered to web interface 260. Thus, there is no need for a third party web programmer at application server 240 to integrate multiple widgets and applications on web page 241 to provide an advanced, customized video player. Furthermore, there is no need for coordinating an upgrade to the network of multiple live video sources, as the most up-to-date advanced video player is fetched at the time of use. Thus, by including embedded code lines 245, a viewer accessing third party application server 240 is able to run an updated and customized version of the advanced player.

Figure 3:
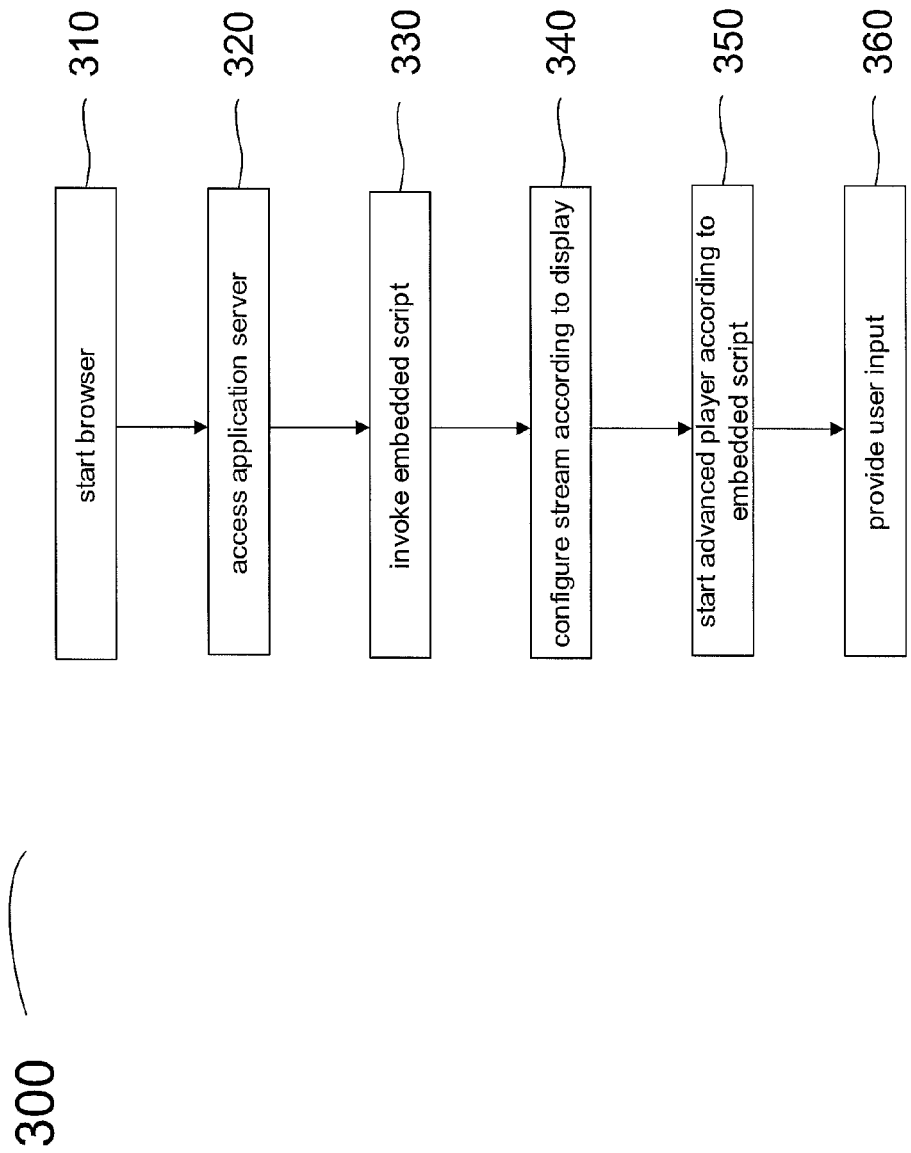
FIG. 3 illustrates a flowchart for a method for providing an advanced player to a client device in a network of multiple live video sources, according to embodiments disclosed herein.

FIG. 3 illustrates flowchart 300 of a method for providing an advanced player to a client device in a network of multiple live video sources, according to embodiments disclosed herein. In this detailed description, flowchart 300 is described using as an example the elements of system 200 of FIG. 2. As shown in FIG. 3, at step 310, a viewer using web interface (e.g., web interface 260) starts a browser application in a computing device (e.g., computing device 262-1). At step 320, the viewer accesses third party application server 240 for a web page that embeds code lines 245. As a result of loading the web page in the browser of web interface 260, embedded code lines 245 are invoked, which accesses application server 220 to retrieve the latest copy of advanced video player 250. As discussed above, application server 220 manages a network of multiple live video sources. In some embodiments, step 320 may include the viewer accessing application server 220 directly, instead of through third party application server 240. In step 330, the browser invokes a executable code lines from the application server that manages the network of multiple live video sources. At web interface 260, upon receiving a web page including advanced video player 250, web interface 260 loads advanced video player 250 as a plug-in or applet in web interface 260. In some embodiments, video player 250 may be loaded as an html5 application including a JavaScript that controls a native browser and a video display in devices 262-1 through 262-n. Embedded code lines 245 may initialize advanced video player 250 by providing values of certain parameters, such as the portion on the web page available for advanced video player 250 to occupy and the widget identifier for identifying video player 250 as being sourced from third party application server 240. As discussed above, the widget identifier is used in advanced video player 250's communication with application server 220. According to some embodiments, step 340 may include initializing advanced video player 250 by locking a given instance of advance video player 250 to a specific domain name, unlocking premium features for a registered user or for a user accessing the third party website of a network member registered with application server 220.

In step 340, if web page 241 is configured to automatically display a video stream, advanced video player 250 requests application server 220 to configure the video stream, Application server 220 sets up the video stream to advanced video player 250 through a streaming server (e.g., streaming server 130). At step 350, advanced video player 250 is configured or customized for use. At step 360, the user interacts as appropriate to the desired behavior of the advanced video player 250 through the controls or features displayed within the portion on the web page dedicated to advanced video player 250. Some controls are the familiar controls of a media player (e.g., full screen mode) that are executed locally on device 262. Other controls or features (e.g., start/stop video) result in communication between advanced video player 250 and application server 220. Some examples of features provided in advanced video player 250 include displaying a widget identifier, or displaying a usage parameter (e.g., time spent viewing the video stream). An example of a control in advanced video player 250 is a button allowing the user to vote on the quality or popularity of a video stream currently being displayed. In some embodiments, advanced video player 250 may provide a mechanism for the viewer to report a video alert when inappropriate content is included in the video stream being displayed. In some embodiments, with the viewer's permission, application server 220 may cause advanced video player 250 to store state information in the form of a 'cookie' in device 262.

According to some embodiments, one example of embedded code lines 245 includes the following code lines:

```
<div id="k-widget"></div>
<script type="text/javascript"
    src="http://www.koozoo.com/widget.js">
</script>
    <script type="text/javascript">
        var options = {
            widgetId : "Ovti",
            dimension : [640, 480],
            showDetails : false
        };
    K.init(options);
    </script>
```

In the above code lines, embedded code lines 245 retrieves JavaScript "widget,js", which is located on an application server having the universal resource locator (url) "http://www.koozoo.com/widget.js." Widget.js, when loaded, retrieves advanced video player 250. The remaining code lines provide parameters to be passed to the retrieved JavaScript, such as widget ID is "Ovti," and the dimension of the web page allocated to advanced video player 250 is 640 pixels by 480 pixels. Further included in the above code lines is the directive "K.init," which actually passes the parameter values to advanced video player 250. The specific commands shown in the above code lines are exemplary only, and not limiting. Different code languages and protocols may use different words for similar commands to the ones listed above.

In some embodiments, code lines 245 may include a "screen name" or email address to bring up a family of video streams, all owned by a specific user registered in the network managed by application server 220. As noted above, the number of "options" parameters may increase as new features are added to the network of multiple live video sources hosted by application server 220. In some embodiments, code lines 245 may include a request for an API key. An API key may be configured for use with the given domain name of application server 220, or that of a third party application server registered with the network of multiple live video sources. If the API key is not matched to the domain name in application server 220, advanced player 250 may limit its capabilities to the user in such situations. If the API key matches the domain name in application server 220, advanced player 250 may limit (or increase) its capabilities to the user.

Embedding executable code lines as illustrated in the above code lines enables a dynamic environment for a viewer using a web interface to connect to a network of multiple live video sources as disclosed herein. The viewer, using a regular browser through a web interface, may access the most updated version of an advanced video player to watch a video stream.

Figure 4:
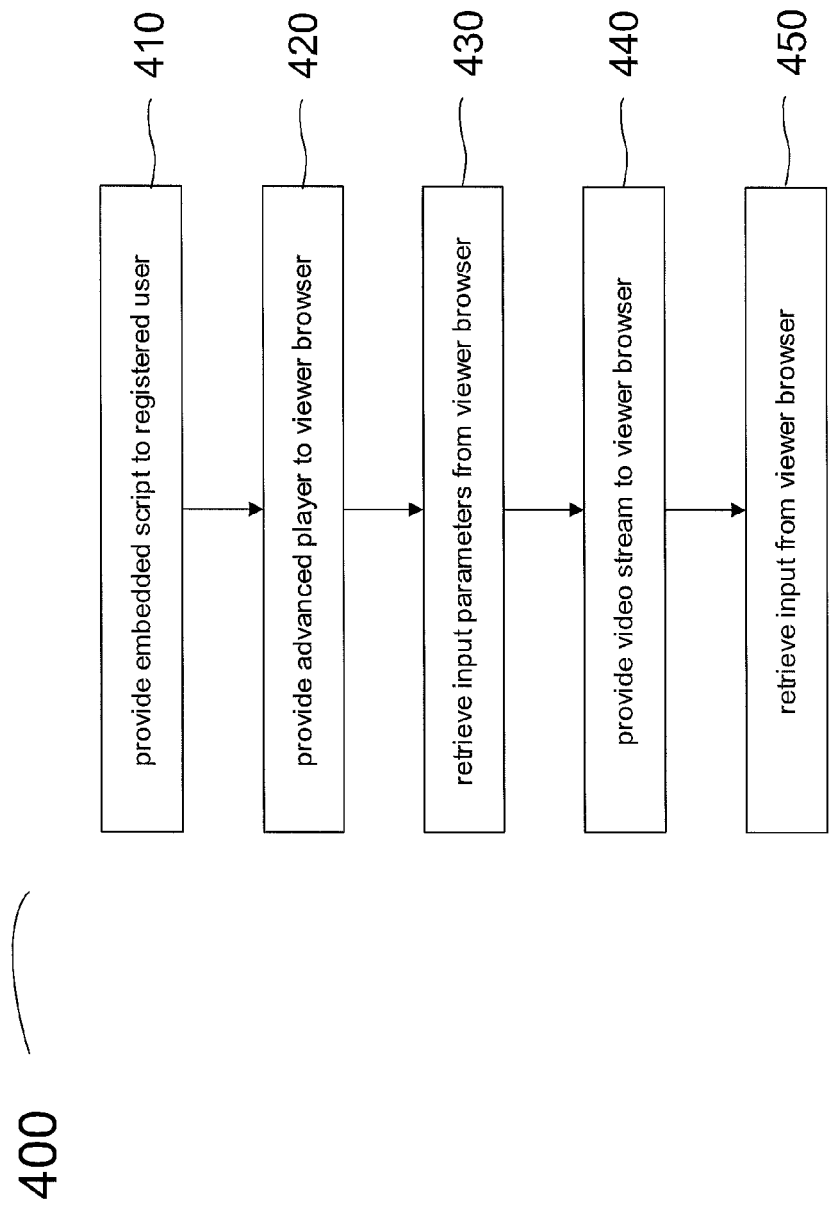
FIG. 4 illustrates a flowchart of a method for an application server to provide a video stream to a viewer accessing a network of multiple live video sources using an advanced player, according to embodiments disclosed herein.

FIG. 4 illustrates flowchart 400 of a method for an application server (e.g., application server 120 of FIG. 1 or application server 220 of FIG. 2) to provide a video stream to a viewer accessing a network of multiple live video sources using an advanced player, according to embodiments disclosed herein. In such a method, the application server may manage the network of multiple live video sources. In this detailed description, flowchart 400 is described using as an example the elements of system 200 of FIG. 2. As shown in FIG. 4, at step 410, application server 220 provides embedded code lines 245 to a user device 262-1 through 262-*n*. In some embodiments, user devices 262-1 through 262-*n* may directly communicate with application server 220. In some embodiments, user devices 262-1 through 262-*n* may communicate with application server 220 through a third party application server 240 registered user. In some embodiments, the registered user embeds embedded code lines 245 in a web page (e.g., web page 241) being hosted by a third party application server 240 registered with the network of multiple live video sources. At step 420, when third party application server 240 serves web page 241 to a viewer at web interface 260, web interface 260 requests from application server 220 a copy of advanced video player 250.

At step 430, application server 220 may receive input parameters from advanced video player 250. For example, an initial set of input parameters may be related to a default video stream associated with web page 241, as discussed above with respect to step 340 of FIG. 3. For example, the input parameters may include a widget ID, identifying embedded code lines 245 provided to registered user. Input parameters may include a "screen name," an e-mail address, newly added options, and an encrypted API key as described in detail above. At this time, application server 220 may also notify advanced video player 250 that the remote camera associated with the default video stream is off-line or is non-existent. At step 440, application server 240 causes a video stream to be provided to advanced video player 250 through a streaming server (e.g., streaming server 130 of FIG. 1) as disclosed herein. At step 450, after advanced video player 250 is configured, application server 220 interacts with advanced video player 250, e.g., receiving input from advanced video player 250. The input may be a widget identifier, or a usage parameter (e.g., time spent by the viewer at advanced video player 250 viewing the video stream), or receiving a vote regarding the quality of a video stream. Further according to some embodiments, at step 450, an application server may receive a video alert from a viewer on the content of a video stream downloaded using the browser.

Figure 5:
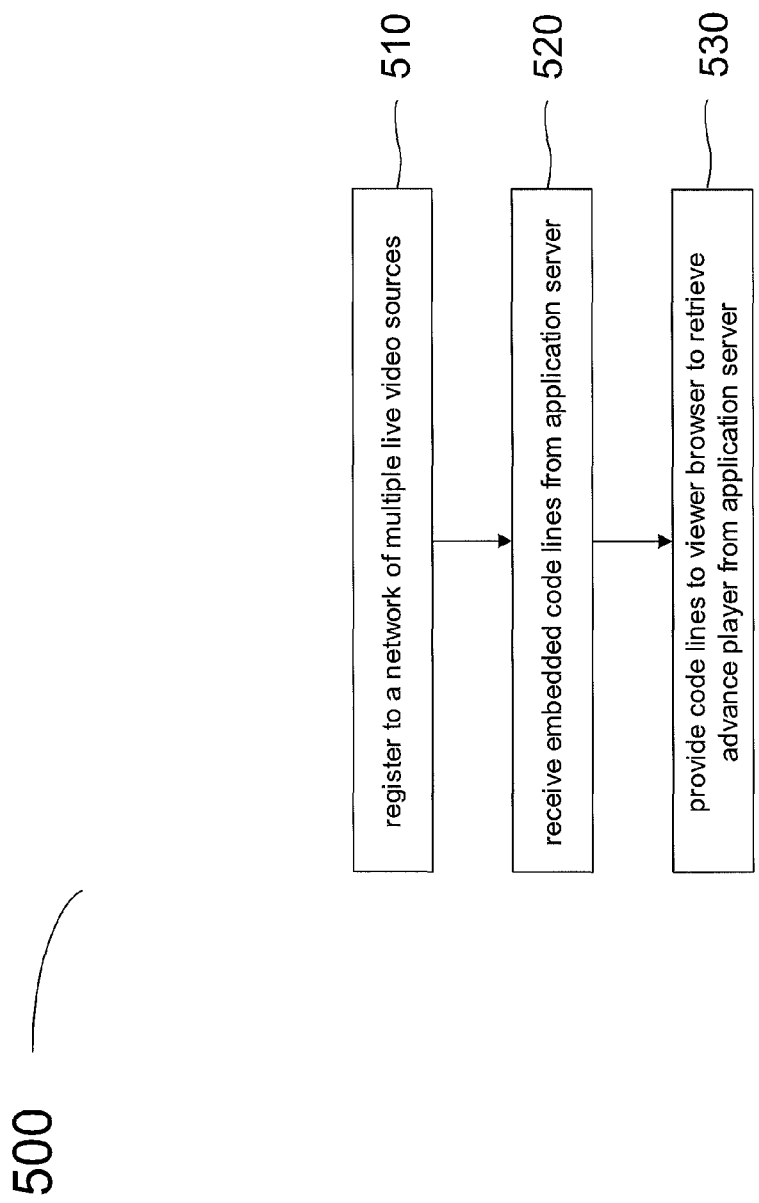
FIG. 5 illustrates a flowchart of a method for providing a video stream to a viewer accessing a network of multiple live video sources using an advanced player according to embodiments disclosed herein.

According to some embodiments, the above code lines referencing JavaScript file "widget.js" may be provided to a web page of a third party vendor. The third party vendor may be registered to a network of multiple live video sources as disclosed herein. Thus, while JavaScript "widget.js" resides in application server 220, a user accessing application server 220 directly or through third party application server 240 may execute the JavaScript. The vendor's web site may be accessed by viewers using a web interface including a browser as described above. FIG. 5 illustrates such embodiments in more detail, as described below.

FIG. 5 illustrates flowchart 500 for a method of using an advanced player in a network of multiple live video sources according to embodiments disclosed herein. A third party application server hosting a third party web page may perform method 500, according to embodiments disclosed herein. For example, a third party may be a user registered to the network of multiple live video sources. The third party may have a web page such as web page 241 hosted by third party application server 240, as described in detail above in relation to FIG. 2.

In step 510 the third party application server is registered to a network of multiple live video sources. The third party application server communicates with application server 220 managing the network of multiple live video sources to perform step 510. In step 520 the third party application server receives embedded code lines from application server 220. The embedded code lines may be as embedded code lines 245 (cf. FIG. 2), including code lines as listed above. The embedded code lines may include instructions to retrieve an advanced player as disclosed herein. In step 530 the application server hosting a web page for a registered user provides the code lines to a viewer browser. In some embodiments, the viewer browser may be running on a device having a web interface accessing web page 241 (cf. FIG. 2).

Further, according to some embodiments, advanced video player 250 may provide additional interactions between the viewer and the remote camera providing the video on canvas 655. Advanced video player 250 as disclosed herein may provide buttons and controls selectable by a viewer to manipulate the remote camera. Such manipulations may include, for example, zooming, panning, or directing the camera to focus on a specific location. Also, the buttons and controls may allow a viewer to control the scenery shown in the video stream. Such buttons and controls may be provided by an advanced player to a 'widget' in a device hosting a web interface from which a viewer is accessing the video stream.

To allow user control of a remote camera, user addressable hardware may be required in the remote camera. A user-selected action from advanced video player 250 is transmitted through application server 220 to camera server 110, which would send the relevant instructions to be executed on the remote camera to achieve the desired actions.

Figure 6A:
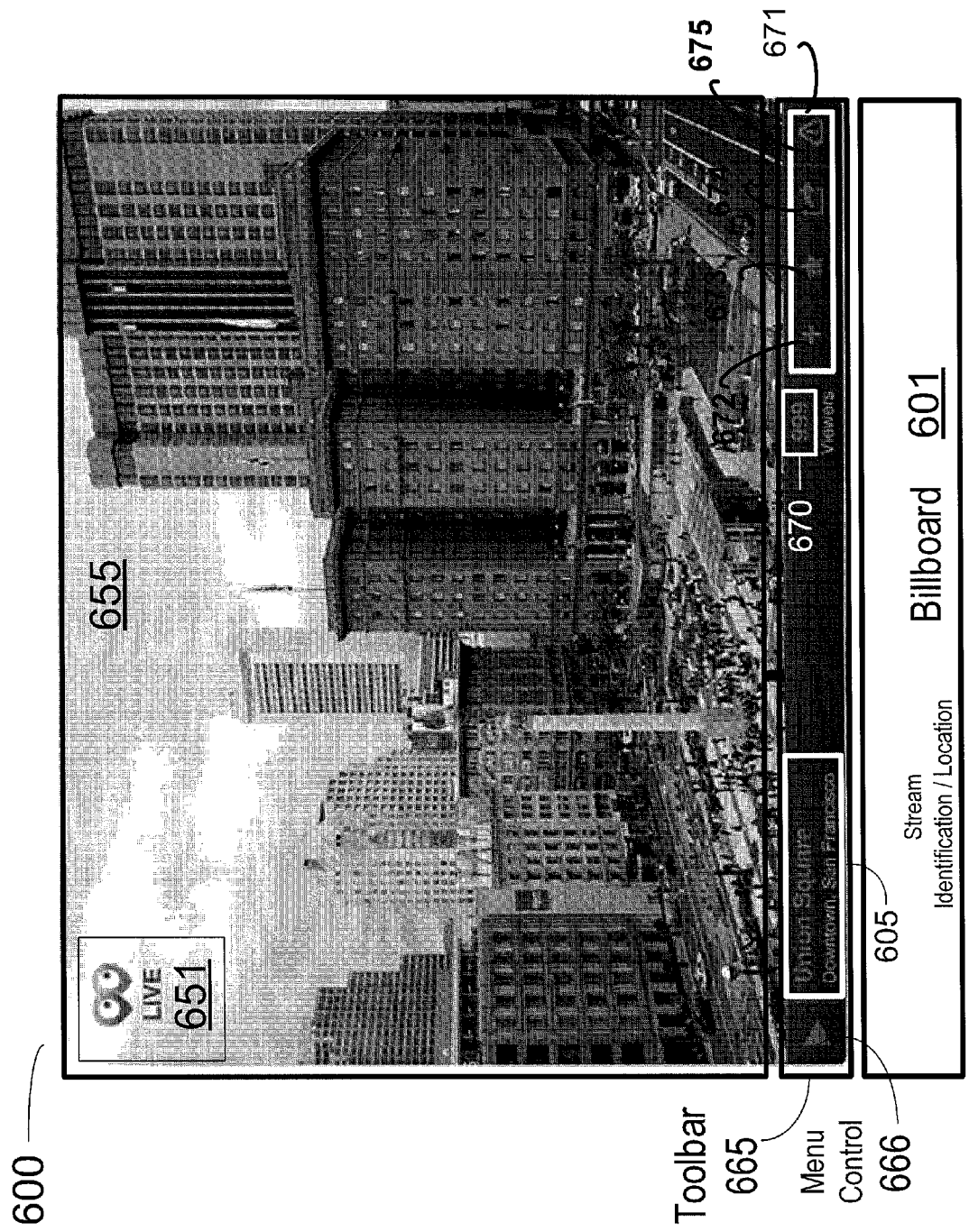
FIG. 6A illustrates a screen shot displayed by a web interface for a network application running on a client device, using an advanced video player according to embodiments disclosed herein.

FIG. 6A illustrates a screen shot 600 displayed by a web interface for a network application running on a client device, using an advanced video player according to embodiments disclosed herein. In this detailed description, screen shot 600 in FIG. 6A and FIG. 6B (below) are described using as an example the elements of system 200 of FIG. 2. Screen shot 600 shows three portions: main canvas 655, billboard 601, and toolbar 665. The video stream, which is provided by a streaming server, such as streaming server 130, is displayed on canvas 655. Some embodiments place a branding overlay 651 within canvas 655. According to some embodiments, canvas 655 receives a video stream from streaming server 130 of FIG. 1 using RTMP or HTTP Live Stream (HLS) protocols.

Toolbar 665 allows a user to control and manage advanced functionality within canvas 655 and billboard 601. According to some embodiments, toolbar 665 may include a JavaScript library common to each platform that it runs on, and interacts with a video application that may be a Flash player (working with RTMP) or an html5 video tag (working with HLS). Toolbar 665 interacts with a viewer and the operating system video control support in device 262. In addition, toolbar 665 establishes a communication channel between the viewer and application server 220. Toolbar 665 provides application server 220 with input data supplied by the user, such as alerts on the video content received or favorite video streams selected. Toolbar 665 retrieves from application server 220 data such as stream identification (location and description) and stream statistics such as viewer metrics, voting statistics, and other stream data such as a thumbnail. Toolbar 665 provides application server 220 data such as described above. Toolbar 665 may also check whether a selected video stream is ready for viewing. In addition, toolbar 665 may collect a vote from the user in relation to a current video stream.

Toolbar 665 may include a menu control 666, a stream identification/location field 605, stream statistics display 670, and context-sensitive controls field 671. Context sensitive control 671 includes 'full screen' button 672, 'add to my favorites' button 673, 'share' button 674, and 'alert' button 665. Controls 666, 671 through 675, and indicators 605 and 670 are integrated into toolbar 665. Thus, application server 220 of the network of multiple live video systems may provide advanced capabilities to a viewer without any additional work by a program developer.

Full screen button 672 causes advanced video player 250 to request the operating system to allow it to use the entire screen of the display for canvas 655. 'My Favorites' button 673 adds the camera providing the current video stream on canvas 655 to a 'My Favorites' list. The 'My Favorites' list, when selected from the dashboard, displays images of remote cameras in the network that have been selected by the user as 'Favorites'. For example, the 'My Favorites' list may include cameras that are registered to the user as a broadcaster, and also cameras registered by other broadcasters that the user selects as a viewer. Share button 674 may include links to an external network to which the user may subscribe. By tapping on share button 674, the user may share the current stream (displayed on canvas 655) with others via common communication methods, such as electronic mail or social media channels. The user may also submit a single screen shot of the video stream displayed on canvas 655 through share button 674 to the external network. The ability for a user to have access to share button 674 may depend on the type of account the user has with application server 220. For example, a broadcaster registered with the application server may have privileges extending to the use of share button 674, allowing the user to send screen shots or video images to the external network, either private or public. Share button 674 provides an interactive field to the user, upon selection. In the interactive field, the user may input an e-mail address, an IP address or a 'LA' so that a link to the video camera streaming the video being displayed on canvas 655 may be established. The alert button 675 enables a viewing user to send an alert message to application server 220. The alert messages may concern inappropriate content of the video stream shown on canvas 655.

Billboard 601 extends the advertisement space to the space below toolbar 665, as needed. In configurations where canvas 655 is set to full screen (e.g. by selecting button 672), a certain portion of the full screen may still be reserved for billboard 601 to include advertisement. Some embodiments of advanced video player 250 as disclosed herein manage billboard 601 through the JavaScript libraries invoked by the video player 250.

In some embodiments, billboard 601 may include other items besides advertising. For example, billboard 601 may provide additional user controls to allow viewing of "time-lapse" movies of a camera's previous content. In some embodiments, billboard 601 may extend toolbar 665, providing controls to extend the feature set of advanced player 250.

In some embodiments consistent with the present disclosure, advanced video player 250 may enable certain buttons within toolbar 665 according to a user profile. Such a user profile may be updated, for example, by back end processor 122 and stored in database 101. Advanced video player 250 as disclosed herein may retrieve the updated user profile from database 101 and enable or disable any of the buttons and fields included in toolbar 765 according to the privileges specified in the user profile.

In some embodiments, a user may be allowed to point a remote camera (e.g., camera 150 of FIG. 1) in a desired direction. A sensor such an accelerometer within the camera may register the new position or orientation of the camera. An application running in the remote camera may then update the metadata associated to the video stream accordingly. The metadata may be provided by the camera to the camera server (e.g., camera server 110 in FIG. 1). Then, application server 220 may then cause advanced video player 250 to update screen shot 600 to include the new location information for the camera provided in field 605 of toolbar 665.

Further embodiments of an advanced player as disclosed herein may be able to retrieve location information for the camera providing the video stream. With this location information, advanced video player 250 may be able to identify remote cameras located in the vicinity of the camera providing the video stream. With camera-manipulation ability enabled, advanced video player 250 may allow the viewer to pan the image from one camera to another camera, thus achieving a contiguous field of view. For example, a 'panning' feature such as described above may be provided in the form of a dial[2] placed inside a toolbar. By turning the dial, a viewer may switch from a video stream provided by one remote camera to the next video stream in a list. Moreover, advanced video player 250 as disclosed herein may provide a selectable feature for the viewer to place two or more video streams side by side to share canvas 655. Such a feature may be used to create a panoramic view of a location using closely located remote cameras.

[2] A virtual dial

Figure 6B:
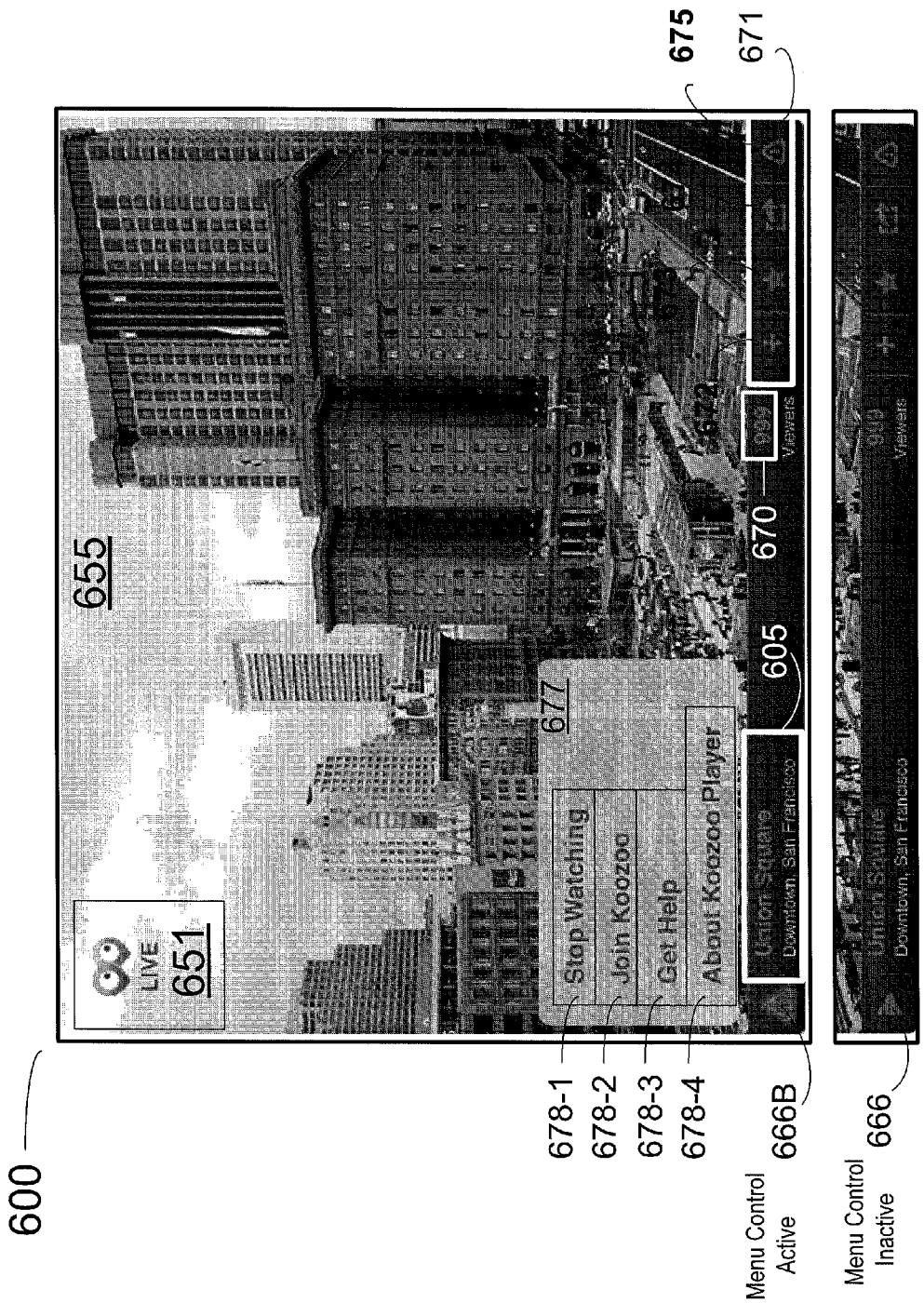
FIG. 6B illustrates a second screen shot displayed by a user interface for a network application running on a client device, using an advanced player according to embodiments disclosed herein.

FIG. 6B illustrates screen shot 600 of web interface 260 for a network application running on computing device 262, using advanced video player 250, according to embodiments disclosed herein. As shown in FIG. 6B, the user may activate menu control 666 on toolbar 665 into active menu 666B. Active menu 666B displays menu 677 which includes option items 678-1 through 678-4. 'Stop watching' option 678-1 sends a command to application server 220, which in turns sends a command to streaming server 130 to stop the current video stream.

Options 678-1 through 678-4 are not limiting. One of ordinary skill in the art would recognize that many other options may be included in menu 677 according to the desires and needs of a given feature set offered by advanced player 250.

In response to the user selecting option 678-1 in advanced video player 250 as disclosed herein, application server 220 may ascertain that no other web interface is actively displaying a video stream from the corresponding camera. Under such circumstances, and in order to optimize use of network resources, application server 220 may also direct camera server 110 to stop the video stream concerned, placing the camera temporarily off-line. When a camera is placed off-line by camera server 110, a message is provided on the attached display of the camera, so as to notify the 'broadcasting' user of the action taken by camera server 110.

According to embodiments consistent with the present disclosure, 'Join Koozoo' option 678-2 may be included in menu 677. Option 678-2 invites the viewer to register in the network of system 100. When option 678-2 is selected, a prompt may appear on screen shot 600 requesting personal information from the user, such as an e-mail address, a log-in name, and a password selection. Menu 677 may also include a 'Get help' option 678-3. When option 678-3 is selected, advanced video camera 250 may fetch from application server 220 an online manual or guidance to a viewer. The manual may include a glossary and may display a new menu with a help index to allow the user to find answers to specific queries. When option 678-4 is selected, the user is provided with information about the version of advanced video player 250 being run. The user may also review currently active customized settings of advanced video player 250 by selecting option 678-4 from menu 677.

Advanced video player 250 as disclosed herein is a is included in a web page running within the user's browser. As advanced video player 250 is fetched when a web page including embedded code lines 245 is served, the most up-to-date version, incorporating new features and bug fixes, is provided without the user having to go through a sophisticated installation or update procedure to activate the new software on the computing device.

Figure 7:
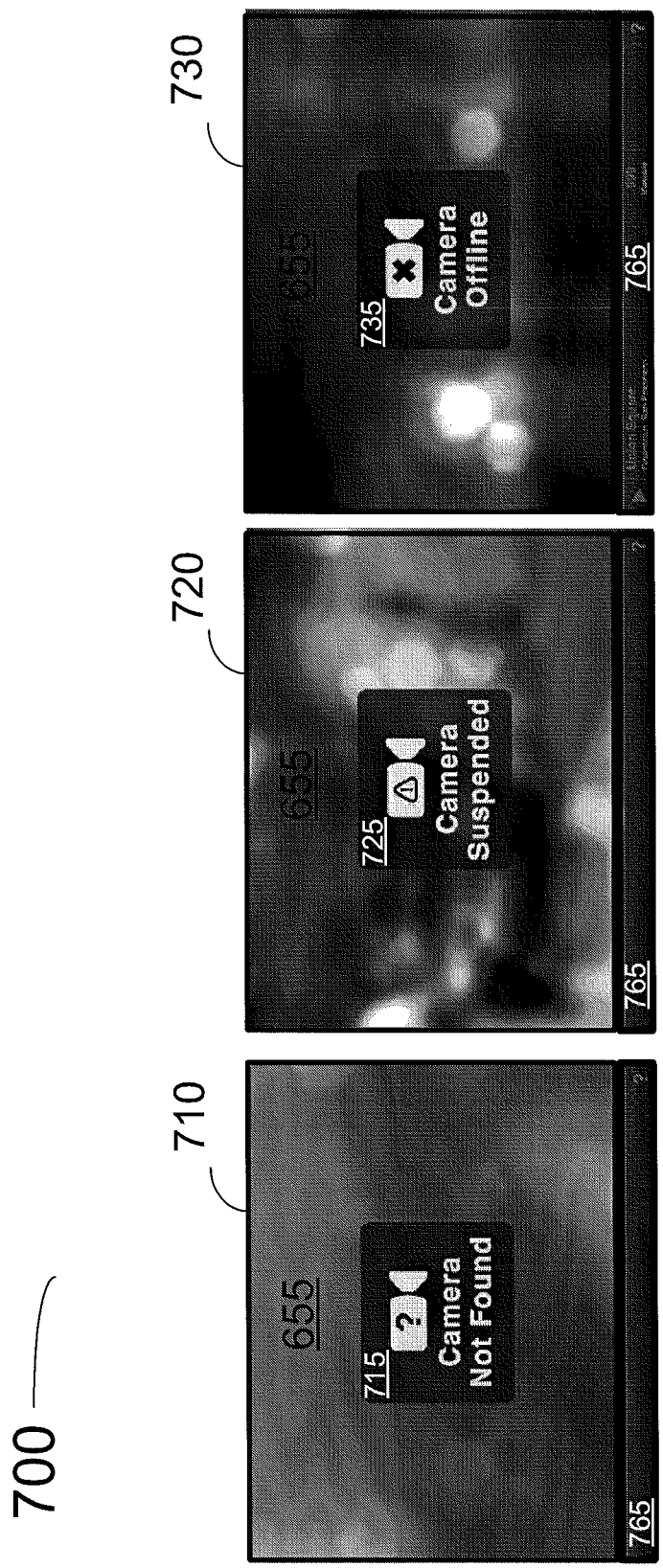
FIG. 7 illustrates three screen shots displayed by a network application running on a client device, using an advanced player according to embodiments disclosed herein.

FIG. 7 illustrates advanced video player 250 displaying on a canvas images 710, 720, and 730 for a network application, according to embodiments disclosed herein. In this detailed description, FIGS. 7-12 are described using as an example the elements of system 200 of FIG. 2. According to embodiments disclosed herein, toolbar 765 adapts to changes in status in the video streams such that the video content displayed drives the application state. For example, some embodiments of application server 220 illustrated in FIG. 1 may provide error indicators 715, 725, and 735 for the displayed camera or cameras (e.g., camera device 150). Error states are reported by camera server 110 to application server 220. Error indicator 715 indicates a hardware or network problem, resulting in the inability to access the desired camera. Error indicator 725 reports that the desired camera is suspended. A broadcasting user may be suspended due to showing inappropriate video content or other violation of the terms of service (ToS) governing the broadcasting user's account. Error indicator 735 shows an 'off-line' state of a camera. A camera may be placed 'off-line' for various reasons. According to some embodiments consistent with the present disclosure, a camera may be placed off-line by a camera server because no viewer expresses interest in the video content from the camera.

While FIG. 7 shows three different status states, additional error states may be handled by advanced player 250. The specific examples illustrated in FIG. 7 are thus not limiting the scope of the present disclosure.

Figure 8:
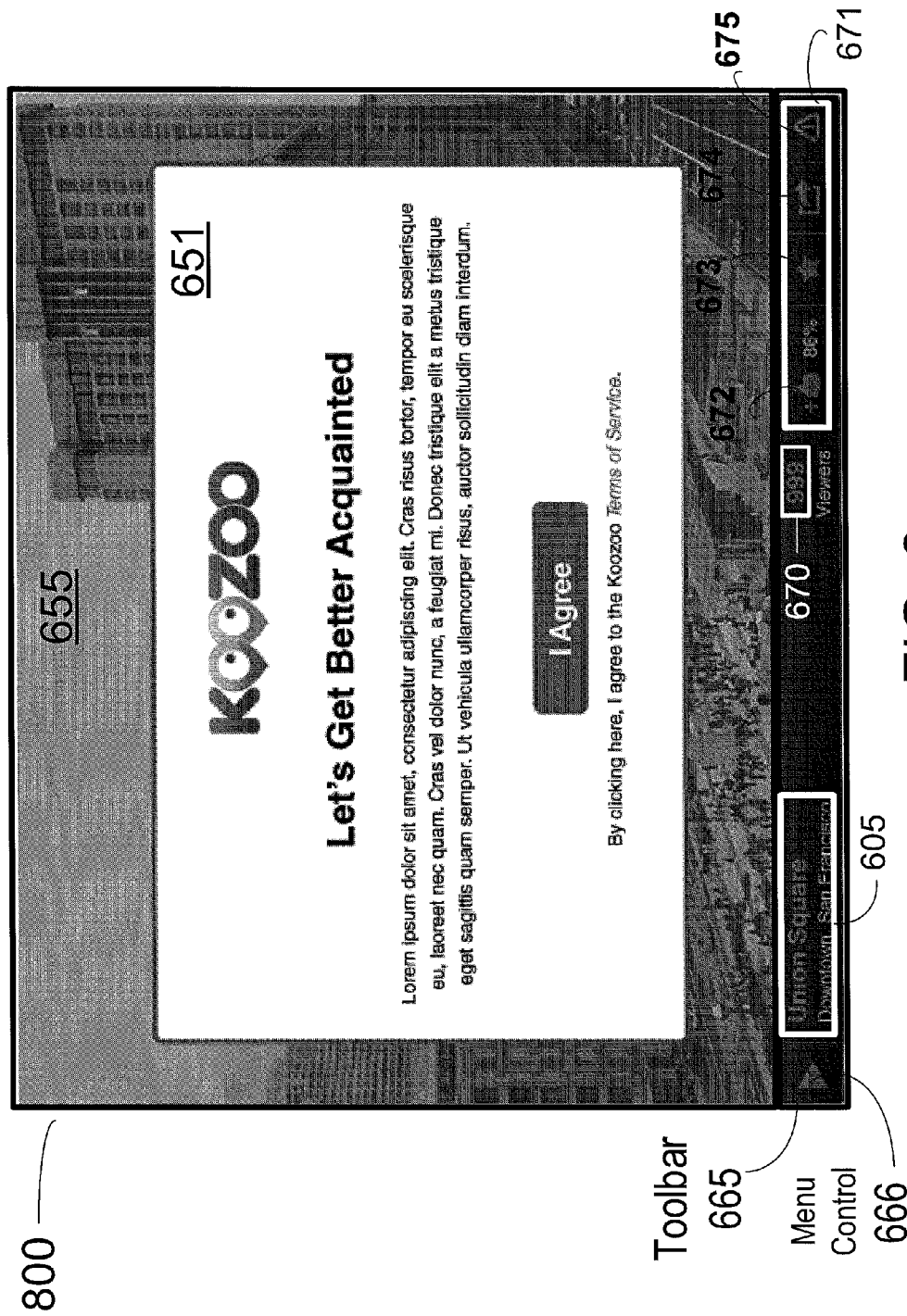
FIG. 8 illustrates a screen shot displayed by a user interface for a network application running on a client device, using an advanced player according to embodiments disclosed herein.

FIG. 8 illustrates screen shot 800 on canvas 655 displayed by advanced video player 250 running on client device 262, according to embodiments disclosed herein. As shown in FIG. 8, advanced video player 250 executes a business rule that requests the user's acceptance of the terms of service (ToS) expressed in an unspecified European language. In some embodiments, advanced video player 250 determines whether or not a user has an existing relationship with the network of multiple live video sources. Depending on whether or not the user has registered with the network of multiple live video sources, application server 220 delivers a different experience to the user, such as requiring the user to agree to the ToS before the user's first use of the network. Input field 851 is an interactive window used to receive input from a user acknowledgement of the ToS. According to some embodiments, field 951 is shown the first time a user requests to view a video stream from a camera in the network. The user need not be a registered user of the network (acceptance of the ToS is a separate procedure from registration to the network). According to some embodiments, acceptance of the ToS allows the user viewer to access with video content from any public camera within the network. Moreover, according to some embodiments, once a user acknowledges and accepts the ToS of the network, application server 220 may cause a cookie or another state indicator to be stored in the computing device. The information in the cookie or other indicator may be provided to application server 220 to facilitate subsequent accesses to application server 220. Application server 220 records the user's acceptance of the ToS in database 101.

Figure 9:
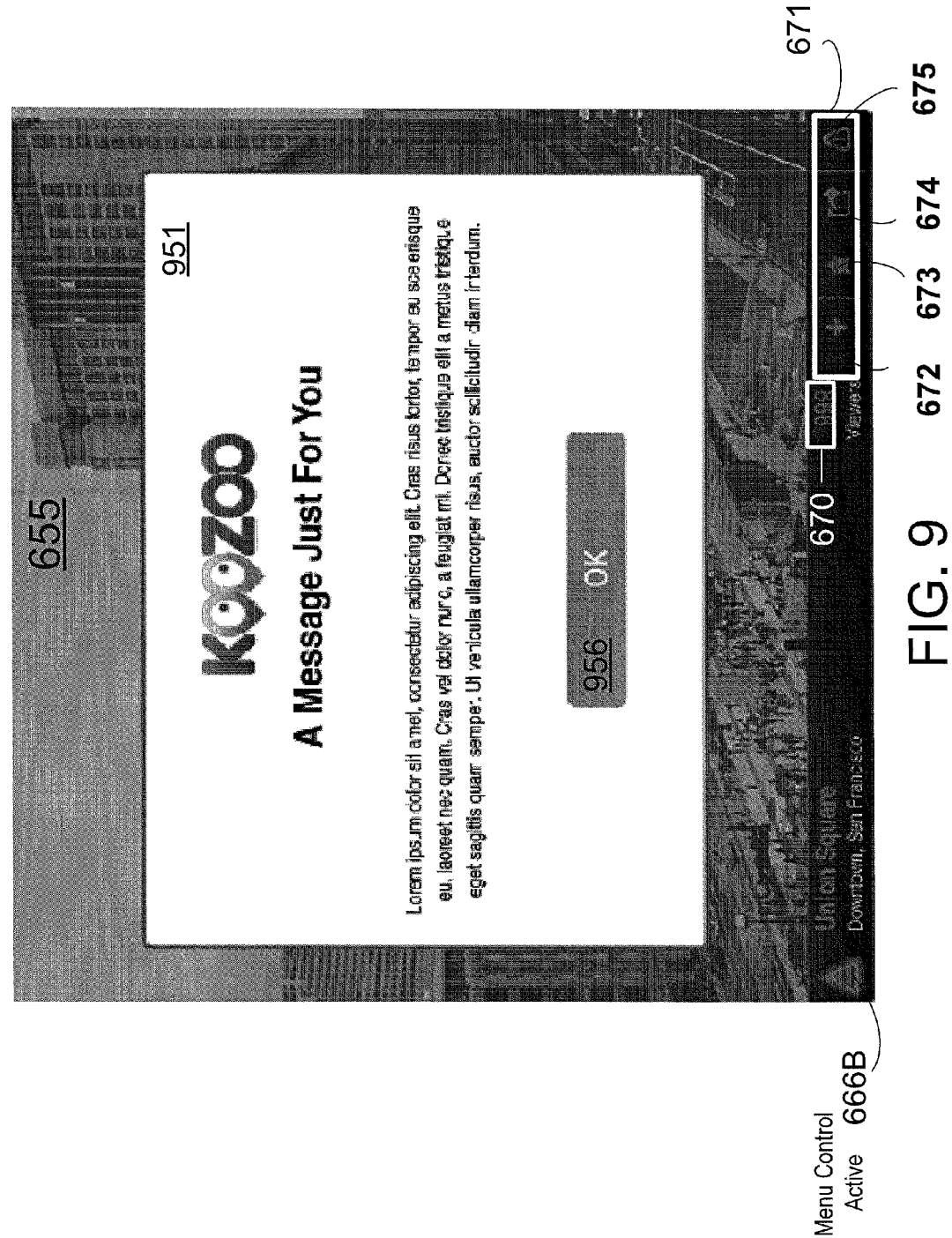
FIG. 9 illustrates a screen shot displayed by a user interface for a network application running on a client device, using an advanced player according to embodiments disclosed herein.

FIG. 9 illustrates screen shot 900 displayed by advanced video player 250 running on a client device, according to embodiments disclosed herein. Advanced video player 250 according to embodiments disclosed herein may include the capability of receiving messages and customized content from the application server 220 to the user. For example, general content may be provided to all users, or content may be customized to a group of users, or to a single, specific user. Screen shot 900 is sent when a user accesses the application server at the beginning of a first time use. According to some embodiments, communications are provided on a scheduled delivery. Further according to some embodiments, communications are conditional upon a user action.

The communications are provided within an input field 951 overlaid on canvas 655. Input field 951 includes a text message for the user, and a button 956. By tapping on button 956, the user acknowledges receipt of the message, and field 951 is then withdrawn. Two-way communications provided by advanced video player 250 between application server 220 and the user enables a wide range of interactivity. Further, according to some embodiments, application server 220 may send messages to all users or customized messages a subset of users (including a single user, if appropriate). The ability to send customized messages to different users may take advantage of the current location data of each user. In some embodiments, advanced video player 250 on each of computing devices 262-1 to 262-*n*, for example, may report their respective locations as information 255-1, 255-2, through 255-*n* to application server 220. According to a viewer's reported location, application server 220 may provide a specific message to the viewer (as well as other viewers in close-by locations) relevant to the location. For example, such a message may warn a viewer of a power outage or a network service outage scheduled or occurring in certain region. In some embodiments, a customized message may alert a viewer or a group of viewers about an earthquake, a tornado, a storm or some other meteorological condition affecting a certain region.

Figure 10:
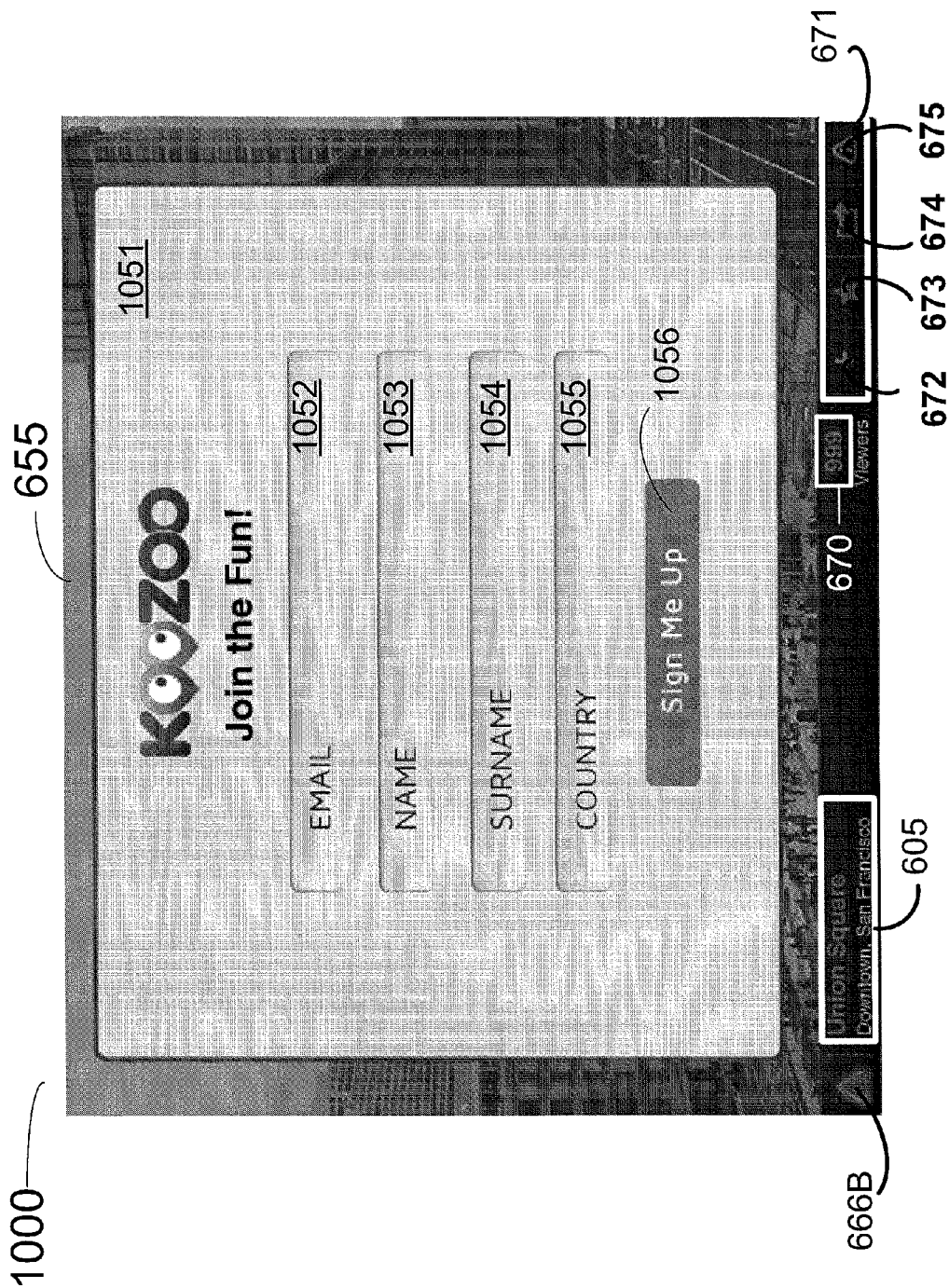
FIG. 10 illustrates a screen shot displayed by a user interface for a network application running on a client device, using an advanced player according to embodiments disclosed herein.

FIG. 10 illustrates screen shot 1000 displayed by advanced video player 250 running on a client device, according to embodiments disclosed herein. Screen shot 1000 includes fields for collecting information of new users. Sign-in field 1051, invite the viewer to become a registered user. Wide dissemination of advanced video player 250 as disclosed herein will raise public awareness of the network of multiple live video sources. Recruiting new members can take place directly within the user interface of advanced video player 250. 'Sign-in' field 1051 includes 'e-mail' field 1052, a 'name' field 1053, a 'surname' field 1054, a 'country' field 1055, and a 'sign me up' field 1056. Once a viewer has filled-in fields 1052, 1053, 1054, and 1055, by tapping on the 'sign me up' field 1056, advanced video player 250 sends the collected information to application server 220 to create an account for the viewer as a new registered user of the network. The specific content and number of fields 1052 through 1055 provided by a user in 'Sign-in' field 1051 are not limiting. Other information may be requested of a user to be registered in the network in addition to fields 1052 through 1055.

Figure 11:
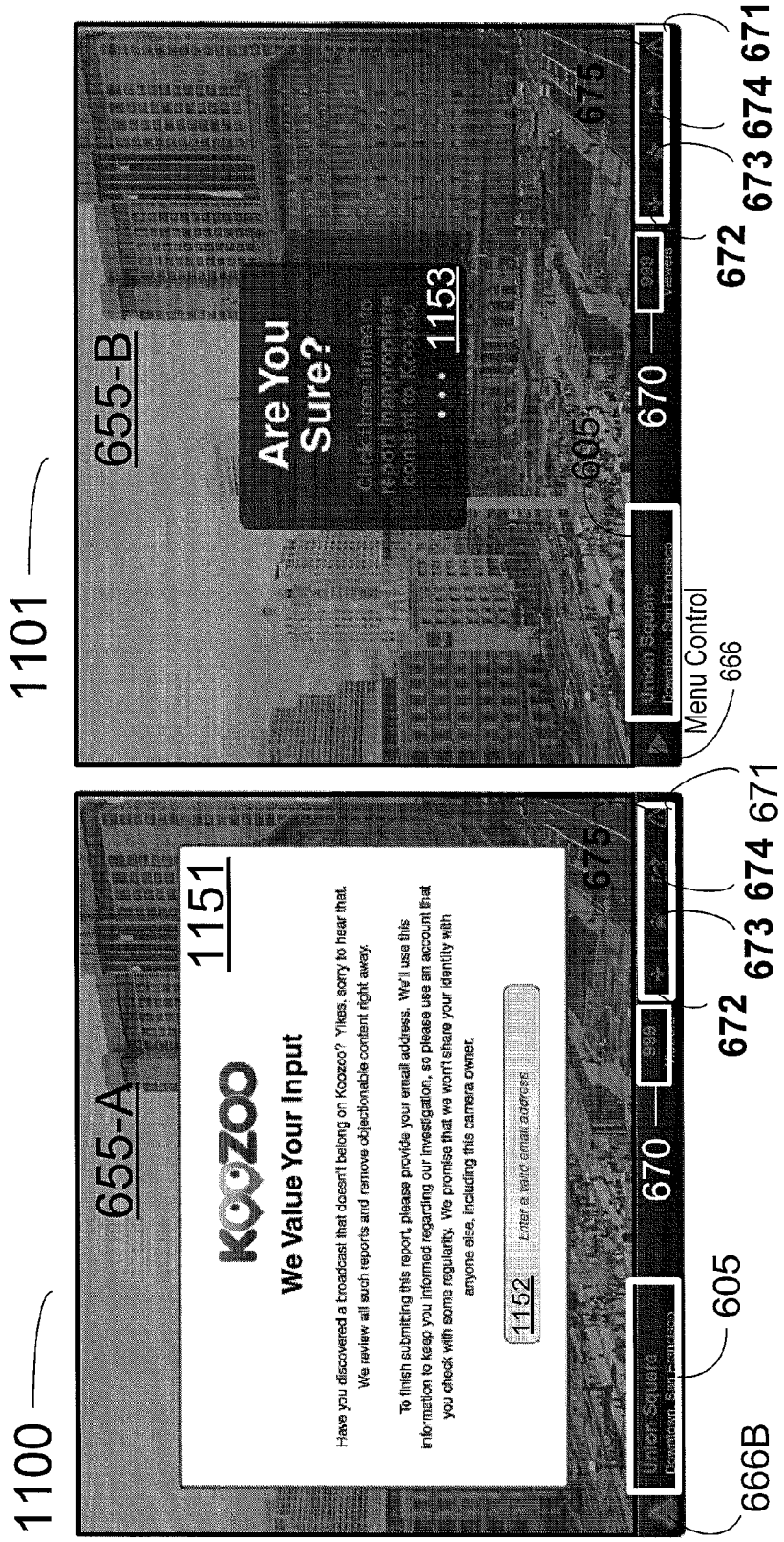
FIG. 11 illustrates a screen shot displayed by a user interface for a network application running on a client device, using an advanced player according to embodiments disclosed herein.

FIG. 11 illustrates screen shots 1100 and 1101 displayed by advanced video player 250 running on a client device, according to embodiments disclosed herein. Advanced video player 250 displays the image shown in screen shot 1100 when a user desires to report network abuse to application server 220. Reporting network abuse may be especially beneficial to prevent dissemination of inappropriate video content. When a viewer determines that the content of the video stream being viewed is inappropriate, or otherwise desires to report a specific issue with a video stream, the viewer may tap on alert button 675. If alert button 675 is tapped for the first time on device 262, advanced video player 220 opens interactive field 1151 in canvas 655-A. Interactive field 1151 requests the reporting viewer to enter a valid e-mail address in field 1152. Thus, advanced video player 250 collects user information and stores it in database 101. Further, as a response to the viewer entering and submitting an e-mail address in field 1152, application server 220 may cause advanced video player 250 to place a 'cookie' in the computing device. Thus, application server 220 is able to recognize the same viewer at the next time the viewer makes another report from the same computing device. Advanced video player 250 may seek permission for creating the cookie by displaying a message, such as "remember me always on this computer" in field 1152, and solicits a response by the user to confirm. According to some embodiments, as shown in screen shot 1101, the user is requested to confirm his desire to submit the user report by tapping a number of times, such as three (3) times or more, on interactive field 1153. Thus, canvass 655-A illustrates a first-time, unauthenticated scenario, whereas 655-B illustrates a subsequent instance for an already authenticated user has (e.g. as determined by a cookie).

Figure 12:
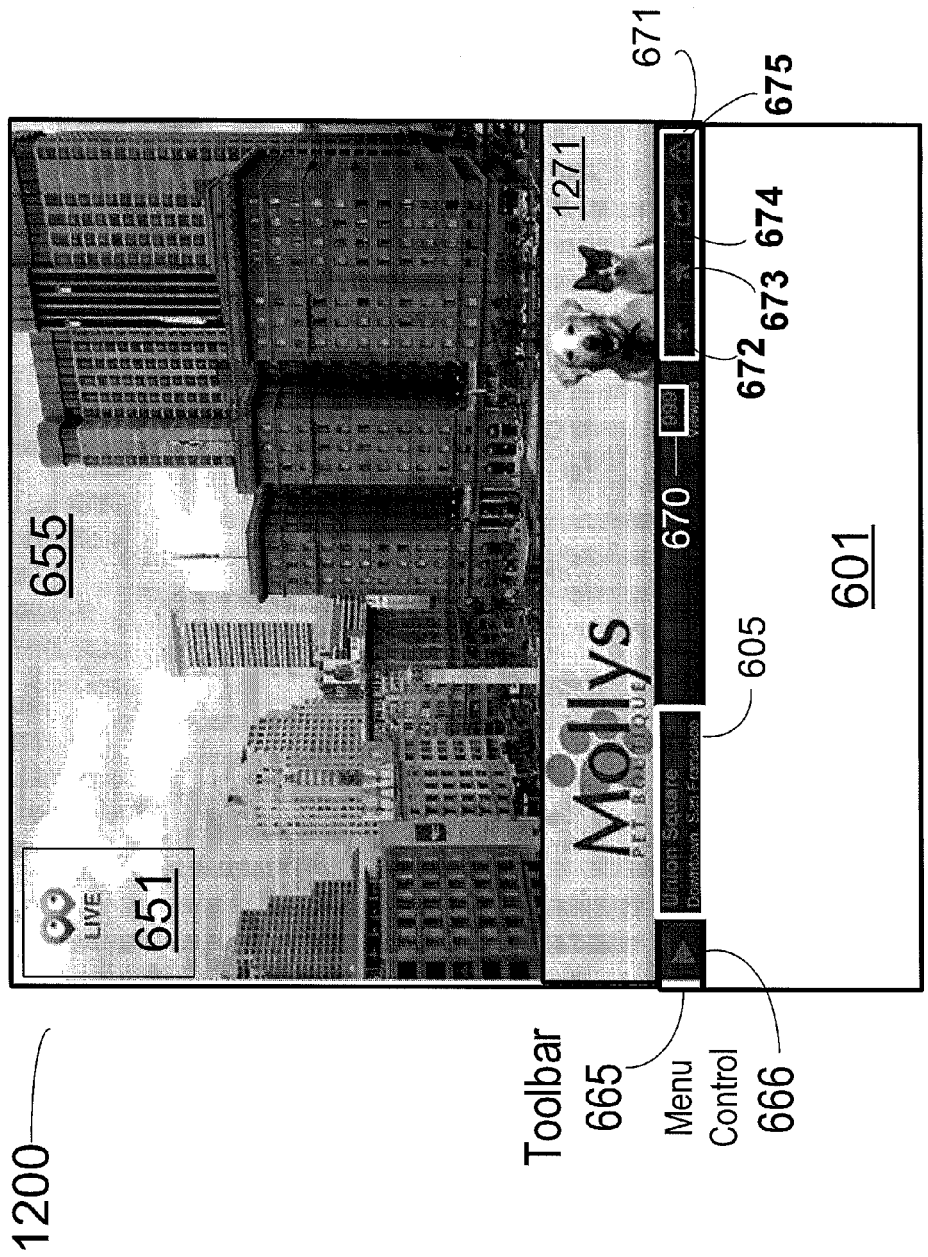
FIG. 12 illustrates a screen shot displayed on a user interface for a network application running on a client device, using an advanced player according to embodiments disclosed herein.

FIG. 12 illustrates screen shot 1200 displayed by advanced player video player 250 according to embodiments disclosed herein. Screen shot 1300 shows advanced video player 250 integrating advertisements 1271 on canvas 655. In some embodiments, advanced video player 250 as disclosed herein may display a companion advertisement below toolbar 665 in billboard 601 as a "leave-behind." The advertisement in billboard 601 may persist even after the video overlay in canvas 655 has disappeared. For example, in some embodiments advertisement 1271 may be placed within canvas 655 for a certain amount of time, after which the advertisement is removed to billboard 601 for a longer period of time.

The period of time selected by advanced video player 250 to place an advertisement on billboard 601 may vary according to the viewer accessing the video stream. For example, advanced video player 250 may place an advertisement on billboard 601 for a shorter time period, if the user is a registered user. The period of time to place an advertisement in billboard 601 may also depend on the vendor placing the advertisement. Such preference may be incorporated into a business rule maintained in business server 102 of FIG. 1, according to some embodiments disclosed herein. Further according to some embodiments, advanced video player 250 may also determine the period of time to place an advertisement in billboard 601 based on information regarding the broadcast user providing the specific video stream being displayed in canvas 655. For example, in some embodiments, the advertisement may be sponsored by the broadcast user, who may contract with the network for a time that an advertisement is required to be placed on billboard 601 while canvas 655 displays video stream sourced from the broadcast user. This information may be stored in database 101 and administered by business server 102.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A method for providing a video player for a network of multiple live video sources, comprising:
   causing to be included in a webpage a first code line embedding a universal resource locator wherein, when the webpage is received into a web browser running on a computing device, the first code line causes the web browser to retrieve a file specified by the universal resource locator, the file executed within the web browser;
   including in the file a program code wherein, when the program code is executed at the web browser, the program code provides in the web browser a video player having capability to communicate messages between the video player and an application server;
   serving the file to the web browser when the web browser retrieves the executable file at the universal locator; and
   at the application server, handling message communication between the video player and the application server.

2. The method of claim 1 wherein the video player provides a video stream to the computing device when the program code is executed at the web browser.

3. The method of claim 1, wherein the video player sends a message to the application server requesting a specified video stream from one of the live video sources, the method further comprising:
   retrieving from a database information regarding a video source associated with the specified video stream;
   based on the retrieved information from the database, identifying a video source control server for the video source;
   accessing the control server to ready transmission of the specified video stream; and
   accessing a streaming server, and causing the streaming server to interact with the video source control server such that the specified video stream begins transmission to the video player.

4. The method of claim 3 wherein the video player sends a message to the application server requesting a stopping of the specified video stream, whereupon the application server accesses to video source control server to halt transmission of the specified video stream.

5. The method of claim 3, wherein the video control server returns to the application server status information corresponding to the identified video source, the method further comprising forwarding the status information from the application server to the video player for display by the video player.

6. The method of claim 1, wherein the video player provides a control mechanism in a user interface that allows a user to send an alert message to the application server to notify the application server inappropriate content received in a video stream from the network of live video sources.

7. The method of claim 1 wherein the video player displays an alert to the user from the application server.

8. The method of claim 1, wherein the video player provides a control mechanism in a user interface that allows a user to send a voting message to the application server that evaluates the quality of a video stream received from the network of live video sources.

9. The method of claim 1, wherein the video player provides a control mechanism in a user interface that reports activity statistics relating to a video stream received from the network of live video sources.

10. The method of claim 1, wherein the video player provides a first display area in a user interface for displaying advertising, the advertising displayed in the display area being provided by the application server.

11. The method of claim 10, wherein the first display area is a portion of a canvas in the user interface dedicated for displaying stream received from the network of live video sources, wherein the application server requires the video player to cease displaying the advertising in the first display area after a first time period, and wherein the method further comprising displaying in a second display area outside of the canvas advertising having content related to the advertising displayed in the first display area, the advertising in the second display area persisting for a second time period after the advertising in the first display area ceased.

12. The method of claim 1, wherein the video player provides a first display area in a user interface for displaying user controls to receive input from the user.

13. The method of claim 1, wherein the video player provides a control mechanism in a user interface that enables a user to sign-up for membership in the network of live video sources.

14. The method of claim 1, further comprising storing by the video player state information received from the application server.

15. The method of claim 3 wherein the video player displays a toolbar on the computing device, the toolbar comprising features for handling the message communication between the video player and the application server.

16. The method of claim 15 wherein the toolbar comprises a feature to provide an alert message from the user to the application server.

17. The method of claim 15 wherein the toolbar comprises a feature to provide a vote message from the user to the application server.

18. The method of claim 15 wherein the toolbar comprises a feature to provide the video stream from the user to a second user.

19. The method of claim 15 wherein the toolbar comprises a feature to control a remote video camera providing the video stream.

* * * * *